June 21, 1960

J. E. PARRISH 2,941,608

POWER DEVICE

Filed Dec. 11, 1958

INVENTOR.
JAMES E. PARRISH

Joseph B. Lindecker,
ATT'Y

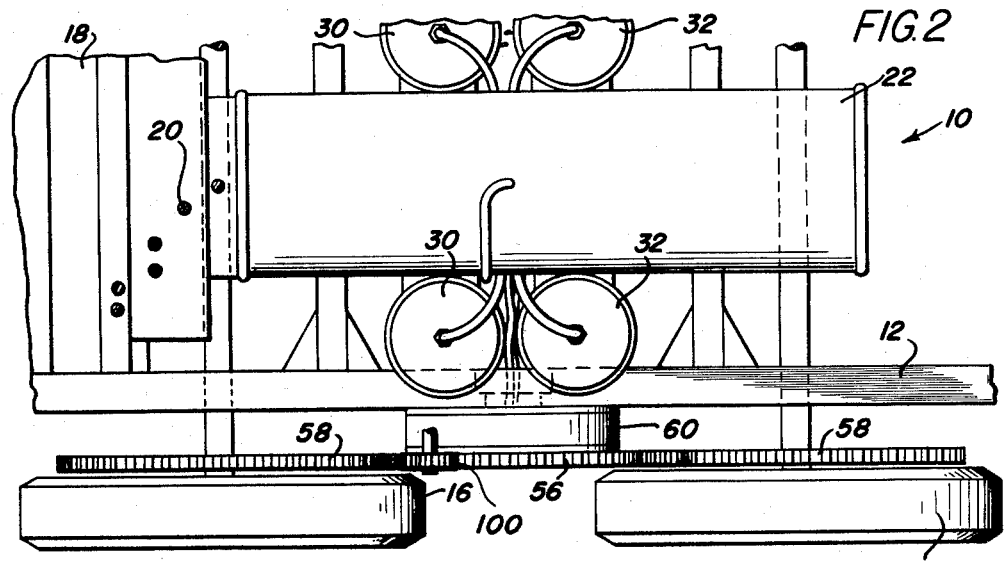
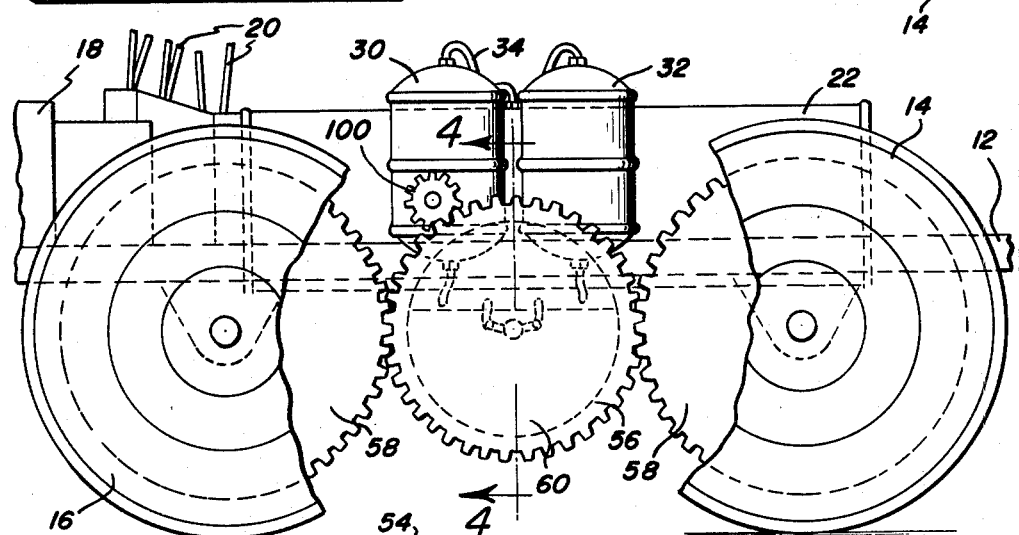
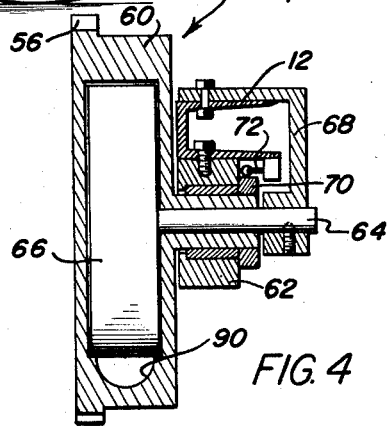

2,941,608
POWER DEVICE

James E. Parrish, P.O. Box 154, Intercession City, Fla.

Filed Dec. 11, 1958, Ser. No. 779,621

3 Claims. (Cl. 180—6.2)

The present invention generally relates to a motive power plant and more particularly to a fluid motor for use in vehicles or in any other place in which power is needed.

The power device of the present invention generally incorporates a gas engine, an air compressor and an air pressure tank communicated with a pair of oil reservoirs, one oil reservoir being empty of oil and one being full of oil, the empty tank having air under pressure therein serving to forcefully pump the oil from the full reservoir to the empty reservoir by allowing this flow of oil to be passed through a fluid motor connected to the driving wheels of a vehicle for driving a vehicle in response to movement of oil from one reservoir to the other, and having automatic valve control whereby the flow of oil is automatically reversed by a cam mechanism.

The primary object of the present invention is to provide a fluid motor for mobile vehicles which is extremely simple in construction, easy to use, comprised of many known components and efficient in operation.

Another object of the present invention is to provide a motor for a vehicle in which both wheels on one side of the vehicle are simultaneously driven.

Still other objects and advantages will appear from the following description of an exemplifying embodiment the accompanying drawings:

Figure 2 is a partial plan view of the motor of the present invention installed on a vehicle;

Figure 3 is an elevation of the construction of Figure 2 with portions thereof broken away; and Figure 4 is a detailed sectional view taken substantially upon a plane passing along section line 4—4 of Figure 3 illustrating the construction of the fluid motor.

Figure 1:
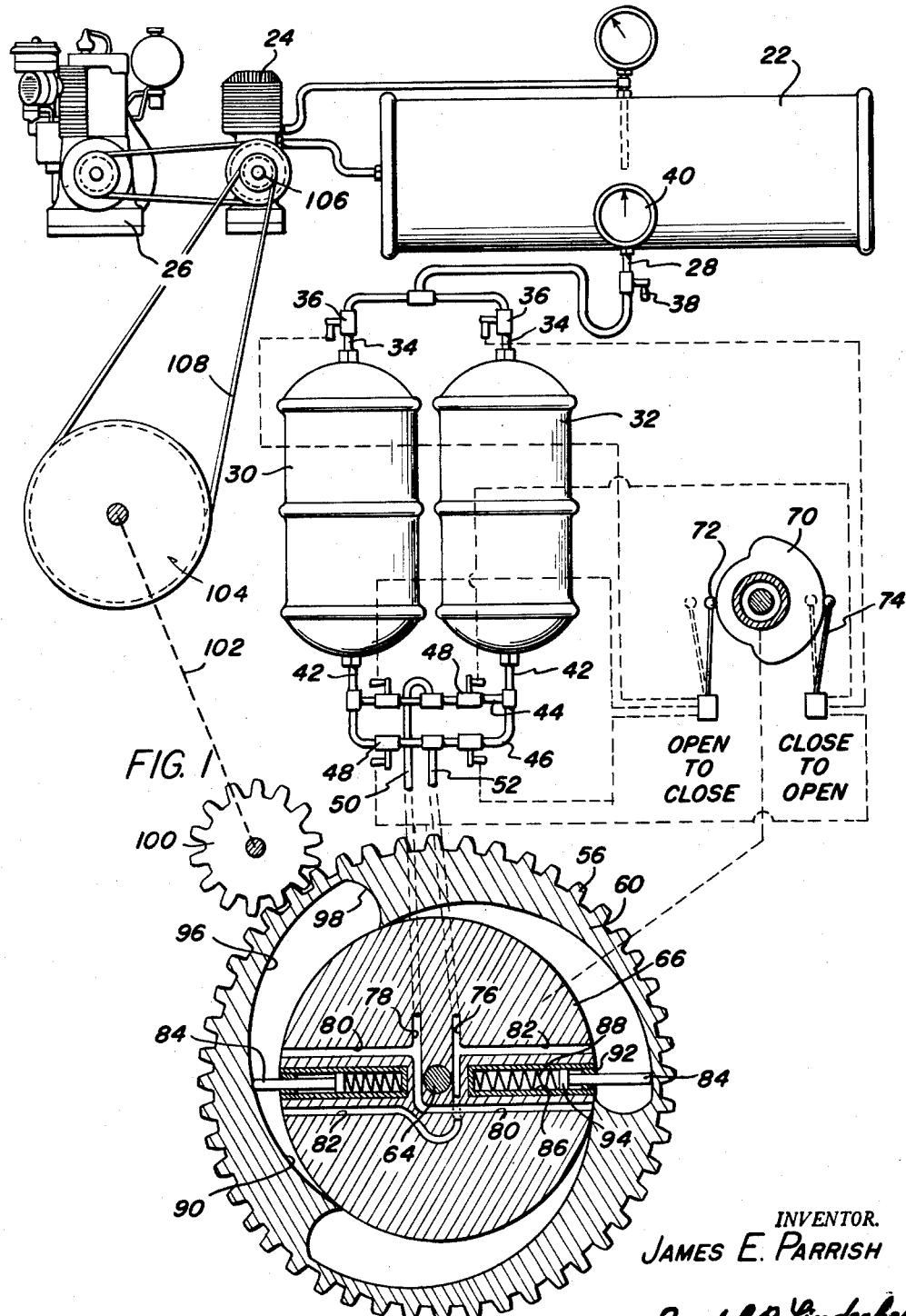
Figure 1 is a schematic illustration of the power device.

Referring now particularly to the drawings, the numeral 10 generally designates the power device of the present invention which is shown as mounted on the frame 12 of a mobile vehicle with the frame 12 having front wheels 14 and rear wheels 16 mounted thereon. An operator's seat 18 is provided on the frame 12 with a plurality of control valve handles 20 mounted adjacent thereto for controlling the power device. A single enlarged air pressure tank 22 is mounted longitudinally of the frame and receives air pressured by the air compressor 24 powered by a small gasoline engine or the like 26.

The air tank 22 is provided with a single discharge pipe 28 for leading to a throttle valve 38 supplying air under pressure to a fluid motor power assembly on each side of the frame. Since these power assemblies are identical only a single assembly will be described in detail. The speed of the fluid motor is controlled by throttle valve 38.

Each power assembly includes a pair of oil tanks or reservoirs 30 and 32 mounted on the frame 12 in any suitable manner. Each reservoir 30 and 32 has an inlet pipe 34 having a valve 36 therein with the inlet pipes 34 being interconnected and which in turn are connected with the single discharge pipe 28 from tank 22 with the pipe 28 also having a valve 38 therein along with a gage 40. Each reservoir is also provided with a discharge pipe 42, the discharge pipes 42 being parallel and being interconnected by a pair of crossover pipes 44 and 46 each having a pair of spaced cut-off valves 48 therein. The pipe 44 is connected with a pressure line 50 and the pipe 46 is connected to a pressure line 52 and the pressure lines 50 and 52 are connected with a fluid motor 54 having a drive gear 56 mounted for disposal between and driving engagement with gears 58 carried by the wheels 14 and 16.

The gear 56 is integral with a cylindrical hollow casing 60 rotatably mounted on the frame 12 by a bearing bracket 62 which also receives a shaft 64 non-rotatably mounted therein having a stator 66 on the end thereof disposed within the casing 60. The shaft 64 and stator 66 are non-rotatable and are supported by support bracket 68 which also houses a cam 70 connected with the power wheel or rotatable casing 60 for controlling the valves 48 on the crossover lines 44 and 46 and the valves 36 by engaging levers 72 and 74 respectively as shown in Figure 1. The cam 70 automatically controls the flow of oil through passageways 76 and 78 in the stator 66 each of which has two branch lines 80 and 82. The branch lines 80 and 82 extend to the periphery of the stator 66 and are disposed on opposite sides of a radially extending vane 84 slidable in a radial blind bore 86. A spring 88 is disposed between the vane 84 and the inner end of the blind bore for urging the same outwardly of the stator 66 into contact with the inner surface 90 of the rotatable casing 60. A retainer 92 in the outer end of the bore or slot 86 slidably receives the vane 84 and prevents the enlarged inner end 94 thereof from sliding completely out of the bore 86.

In operation, the air tank 22 is pumped up to a desired capital pressure in the usual manner. The throttle valve 38 is manually opened to control speed such as by depressing an accelerator pedal to which the same may be attached. With one valve 36 open the other will be closed thus allowing air to enter oil reservoir 30 and pressuring the oil through pipe 42. With the valve 48 on pipe 44 adjacent tank 30 open and the other valve on pipe 44 closed, the oil will flow through conduit 50 into passageway 78 and be discharged between the vane 84 and a pocket 96 in the casing 60 and by exerting pressure on the vane 84 and the abutment formed by the radial and curved deep end 98 of the pocket 96, the casing 60 will be caused to rotate in a clockwise manner as shown in Figure 1. Meanwhile oil between the vane 84 and the shallow end of the pocket 90 passes inwardly through branch lines 82, passageway 76 and into the crossover pipe 46. The valve 48 in pipe 46 nearest the tank 30 is closed and the valve 48 in pipe 46 nearest tank 32 is open whereby the exhausting oil will be returned to the tank or reservoir 32.

The cam 70 operates levers 72 and 74 which control means to reverse the orientation of the valves 48 and 36 whereby the flow of oil through the fluid motor will not change and the tanks or reservoirs will be alternately filled and emptied by virtue of the cam 70 thereby providing a continuously running fluid motor for powering the wheels by using air pressure to pump oil and utilizing the flow and pressure of the oil to rotate a power shaft.

As shown in the drawings, a final supplier for capital pressure is provided which includes a gear 100 meshing with the gear 56 and carried by a shaft 102 shown diagrammatically by Fig. 1, said shaft having an enlarged pulley 104 attached thereto, the pulley 104 is in alignment with a pulley 106 on the compressor 24 and is drivingly connected therewith by a belt 108 to keep up the capital pressure. The purpose of this construction is to take over with an automatic clutch connecting pulley 106 to compressor 24 for producing pressure in the tank after it has been pumped up to normal running pressure by the engine.

It is understood that this invention is not confined to the particular embodiment shown and described, the same being merely illustrative and that this invention may be carried out in other ways within the scope of the appended claims without departing from the spirit of this invention, as it is obvious that the particular embodiment shown and described is only one of the many that may be employed to attain the objects of this invention.

I claim:

1. A power unit for a vehicle comprising a supporting frame, a pair of ground engaging wheels arranged in tandem on opposite sides of said supporting frame, wheel driving gears mounted in tandem with one on each of said wheels, a power driving gear supported in meshing engagement in between each pair of wheel driving gears on opposite sides of said frame, a single compressed air tank mounted on said frame for holding high pressure air, an air compressor to supply the initial high capital pressure to said compressed air tank connected with said compressed air tank, a prime mover connected with said air compressor, a pair of oil reservoirs on each side of said frame and supported thereby, one of each pair of reservoirs being initially filled with oil, the second of each pair being empty of oil when said first is full, a single discharge pipe connected at one end with said single compressed air tank, said discharge pipe having a throttle valve intermediate its ends and connected at its opposite end to cross-over lines connected to the upper portions of each of said pair of reservoirs, a fluid oil motor supported on each side of said frame, each fluid oil motor having a hollow casing rotatably mounted on its power shaft, one of said power driving gears integrally formed with each of said hollow casings, pipe means for conveying oil from the filled oil reservoir on each side of said frame to said fluid motor on the same side thereof, cross over pipe means for connecting the lower end portions of each of reservoir of each pair and having valve means associated therewith for controlling the flow of oil from said oil filled reservoir to the fluid motor and back to said empty reservoir, gear and pulley means connected with said power driving gears and drivingly connected to said air compressor by an automatic clutch connecting pulley for driving said compressor while the motors are running to keep the normal running air pressure in said compressed air tank, cam means connected with said rotating hollow casing for controlling said valves in the cross arms above and below said reservoirs whereby the flow of oil from one reservoir under high pressure to the other reservoir of each pair after passing through a fluid motor is maintained in unidirectional flow during alternating flow from one reservoir to the other of each pair.

2. The power unit as defined in claim 1 wherein each of said crossover pipe means including a pipe having a pair of spaced valves thereon and a pressure line connected to each of the crossover pipes at a point intermediate the spaced valves thereon thereby enabling oil to flow from either reservoir in the same relation to the fluid motor.

3. The structure as defined in claim 1 wherein said fluid motor includes a stator mounted within casing, a plurality of radial vanes in said stator, spring means urging the vanes outwardly of the stator into contact with the periphery of the casing, said casing having arcuate pockets therein each of which have a radial abutment at one end thereof cooperating with the vanes to form an expansible chamber for receiving the oil, and oil passageways in said stator leading to opposite sides of the vane and connected with the crossover pipes for admitting pressured oil between the vane and the abutment and exhausting oil from between the vane and the trailing or tapered edge of the pocket for causing rotation of the casing about the stator.

References Cited in the file of this patent

UNITED STATES PATENTS

| | | |
|---|---|---|
| 1,803,932 | Dooley | May 5, 1931 |
| 2,145,540 | Ellis | Jan. 31, 1939 |
| 2,446,242 | Orshonsky | Aug. 3, 1948 |